United States Patent
Wesseloh

(10) Patent No.: US 7,444,728 B2
(45) Date of Patent: Nov. 4, 2008

(54) ASSEMBLY DEVICE FOR CONNECTING CUP-SHAPED LONGITUDINAL SEGMENTS OF A COVERING BODY BY PLACING AT LEAST ONE LONGITUDINAL CONNECTING JOINT

(75) Inventor: Reiner Wesseloh, Rosengarten-Klecken (DE)

(73) Assignee: Airbus Deutschland GmbH, Hamburg (DE)

( * ) Notice: Subject to any disclaimer, the term of this patent is extended or adjusted under 35 U.S.C. 154(b) by 154 days.

(21) Appl. No.: 10/596,949

(22) PCT Filed: Dec. 21, 2004

(86) PCT No.: PCT/EP2004/014537

§ 371 (c)(1),
(2), (4) Date: Jun. 29, 2006

(87) PCT Pub. No.: WO2005/065864

PCT Pub. Date: Jul. 21, 2005

(65) Prior Publication Data

US 2007/0004278 A1   Jan. 4, 2007

(30) Foreign Application Priority Data

Dec. 30, 2003  (DE) ............................... 103 61 594

(51) Int. Cl.
B21J 15/00 (2006.01)
B21J 15/10 (2006.01)
B23C 1/12 (2006.01)

(52) U.S. Cl. .................. 29/34 B; 29/524.1; 409/212

(58) Field of Classification Search .............. 29/34 B, 29/33 K, 464, 524.1, 525.02, 525.06, 243.53; 409/202, 212; 227/111
See application file for complete search history.

(56) References Cited

U.S. PATENT DOCUMENTS

| 4,662,556 | A |   | 5/1987  | Gidlund |            |
|-----------|---|---|---------|---------|------------|
| 4,762,261 | A | * | 8/1988  | Hawly et al. | 227/111 |
| 4,885,836 | A | * | 12/1989 | Bonomi et al. | 29/34 B |
| 4,966,323 | A | * | 10/1990 | Speller et al. | 29/34 B |
| 5,154,643 | A | * | 10/1992 | Catania et al. | 29/34 B |
| 5,477,597 | A | * | 12/1995 | Catania et al. | 29/34 B |
| 5,611,130 | A | * | 3/1997  | Rummell et al. | 29/34 B |
| 5,661,892 | A | * | 9/1997  | Catania et al. | 29/525.02 |
| 5,836,068 | A | * | 11/1998 | Bullen et al. | 29/34 B |
| 6,088,897 | A | * | 7/2000  | Banks et al. | 29/243.53 |
| 6,098,260 | A | * | 8/2000  | Sarh | 29/243.53 |
| 6,223,413 | B1 | * | 5/2001 | Crocker et al. | 29/524.1 |

FOREIGN PATENT DOCUMENTS

EP    0483947 A2   5/1992
WO   99/37429 A1   7/1999

* cited by examiner

*Primary Examiner*—Dana Ross
(74) *Attorney, Agent, or Firm*—Christopher Paradies; Fowler White Boggs Banker P.A.

(57) ABSTRACT

An installation device connects shell-shaped longitudinal segments of a jacket body. At least one tool pair comprises an inner tool that is movably guided within a hollow space in longitudinal direction of the jacket body and an outer tool that is movably guided outside the hollow space defined in longitudinal direction. The tools act together as a tool pair. The installation device comprises a carrier pair which is formed by an inner guide carrier that extends in a longitudinal direction and movably guides the inner tool within the hollow space and an outer guide carrier that extends in longitudinal direction outside the jacket body and movably guides the outer tool. Each guide carrier is rotatably held and fastenable according to at least one rotary axis oriented to an outer contour of the jacket body, as well as being slidably held and fastenable in at least two separate spatial directions that extend across the longitudinal direction of the body, such that the tools acting together as a pair selectively take up different positions on the longitudinal circumference of the jacket body.

23 Claims, 16 Drawing Sheets

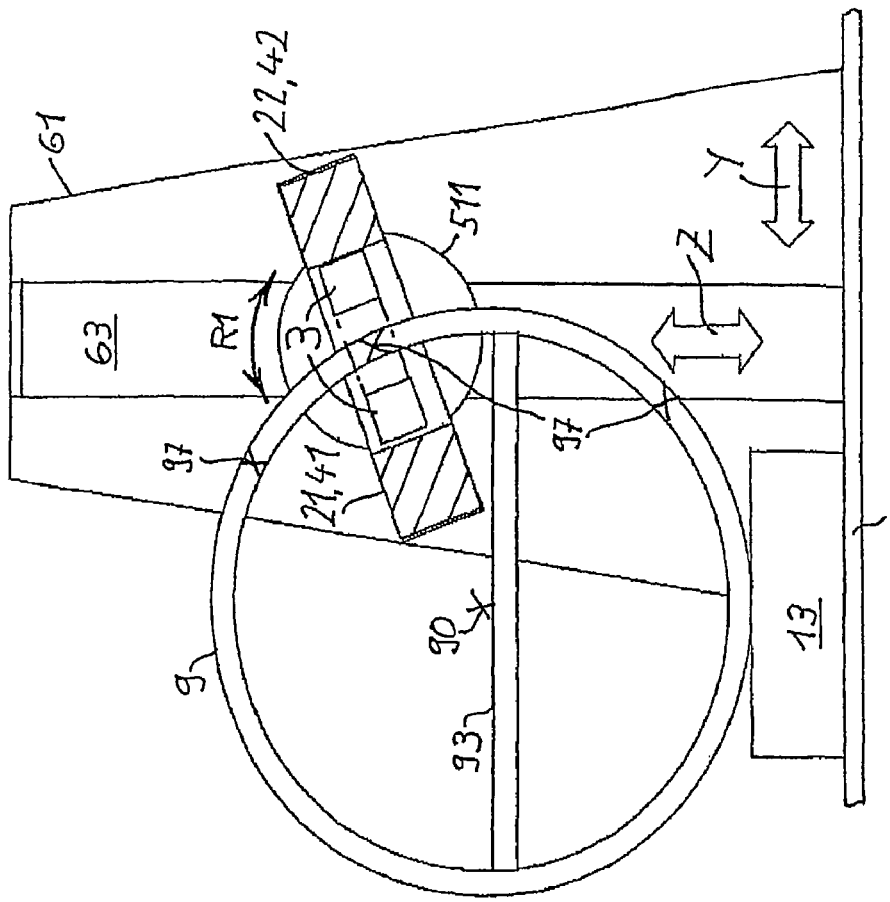
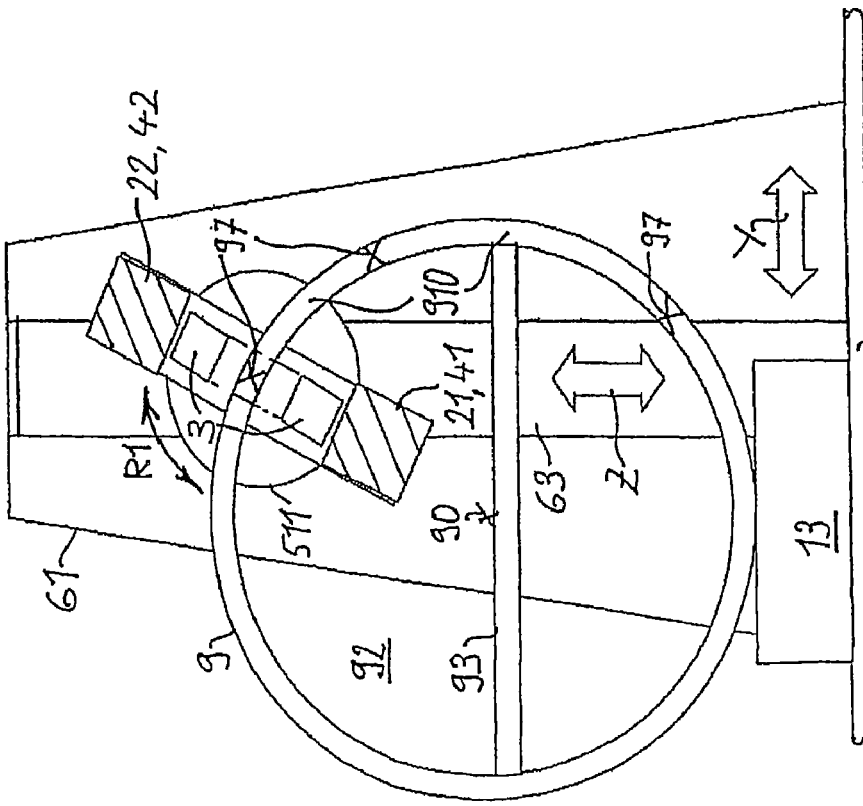

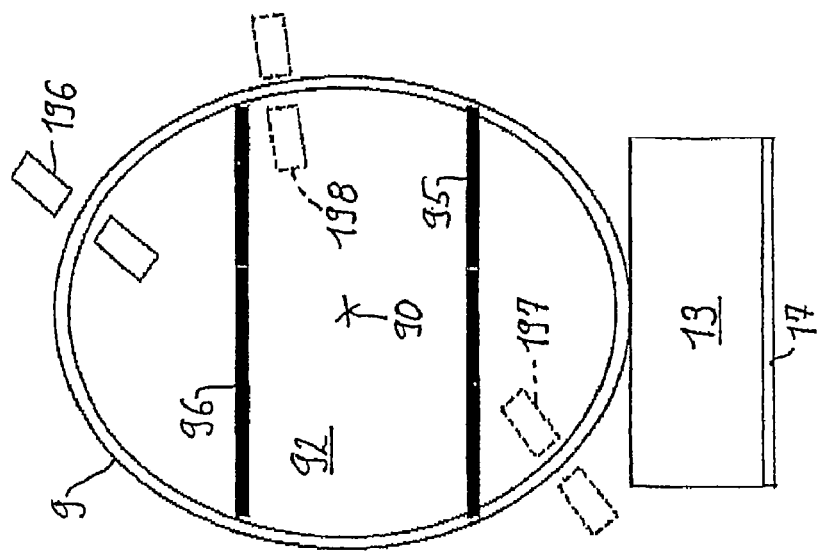
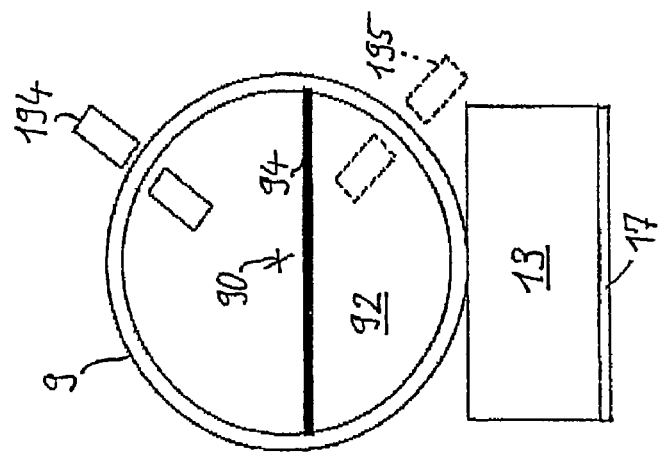
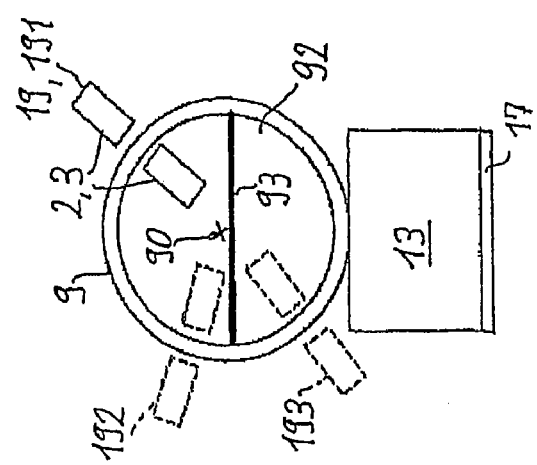
Fig. 7

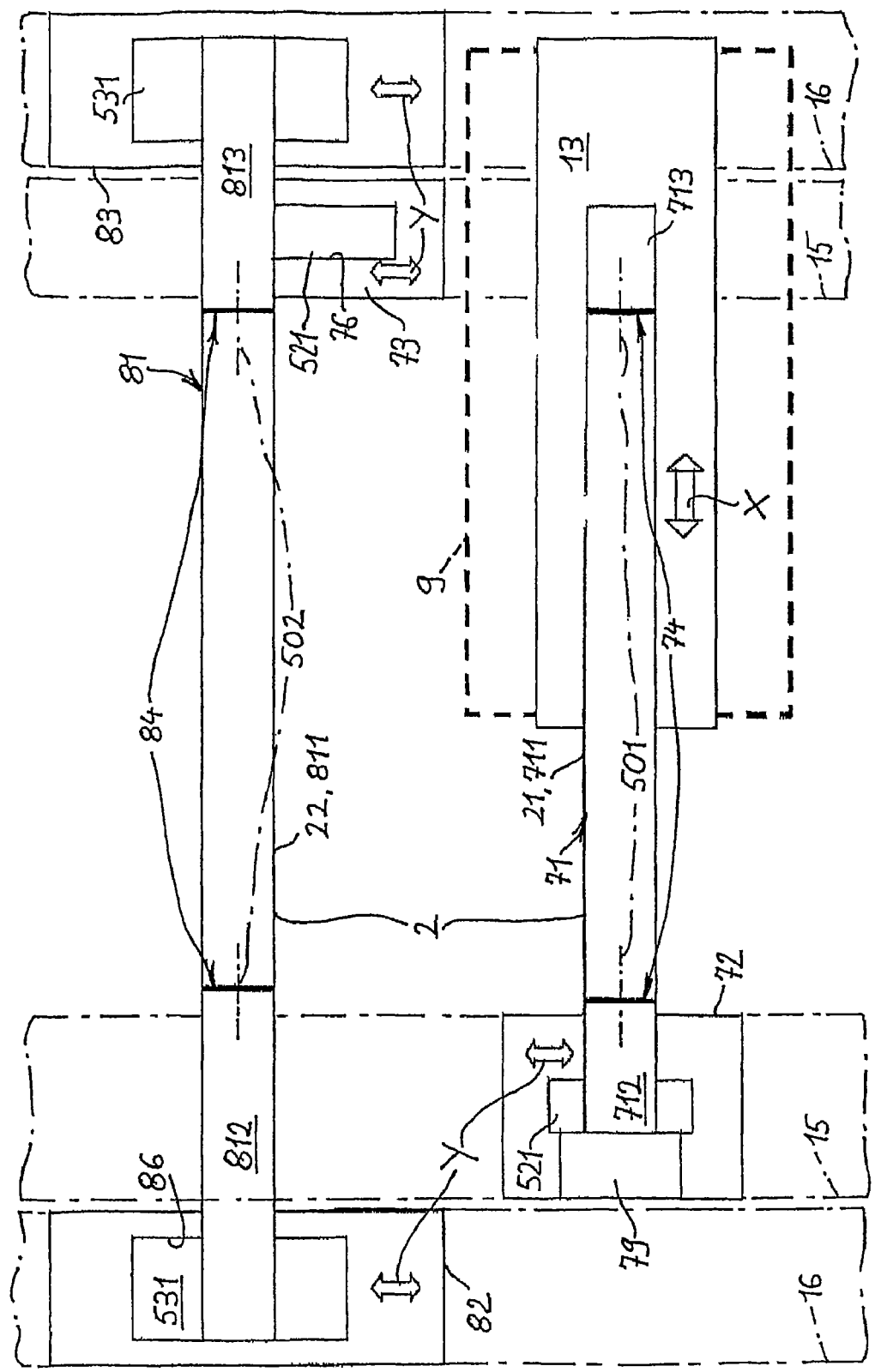

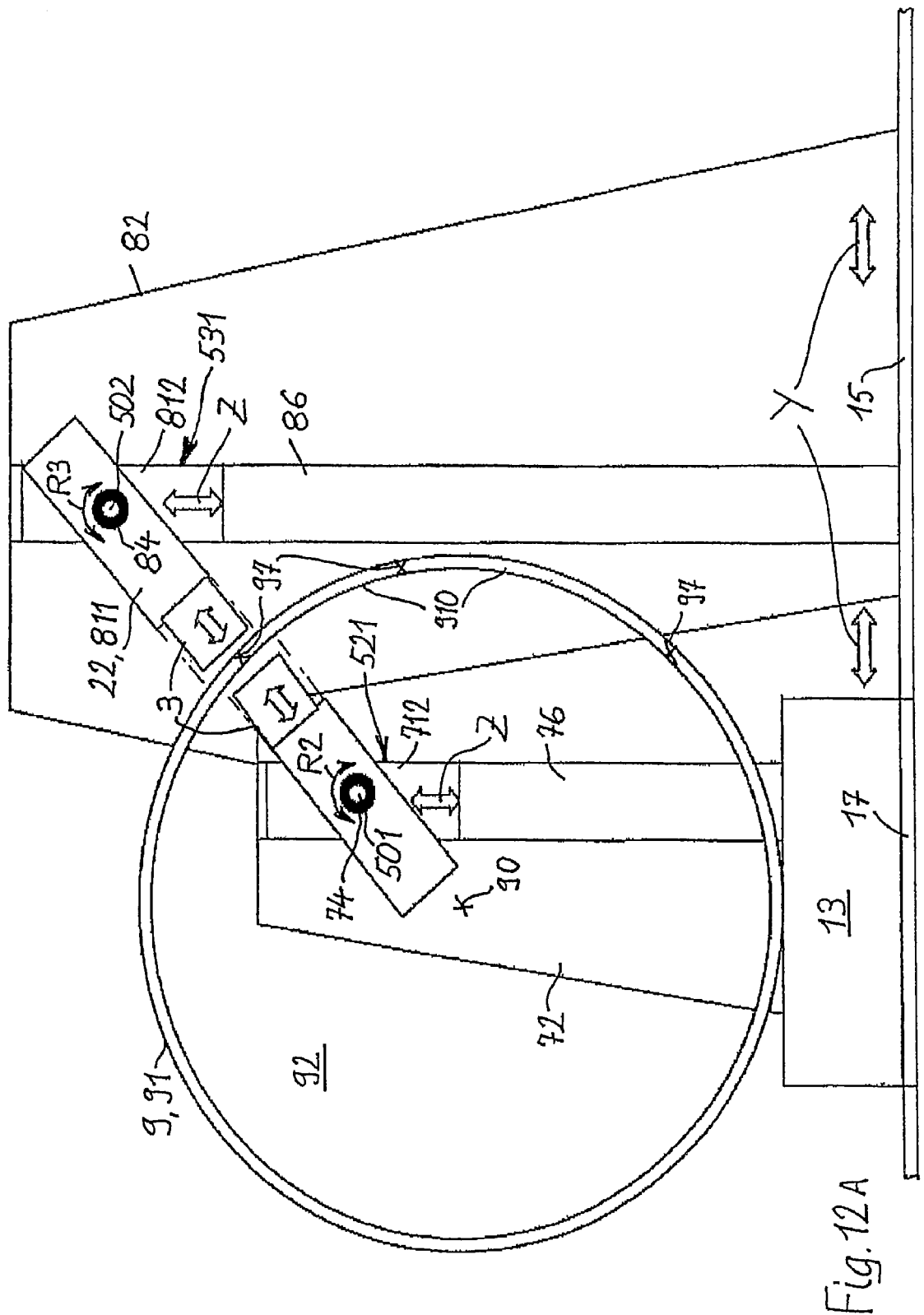

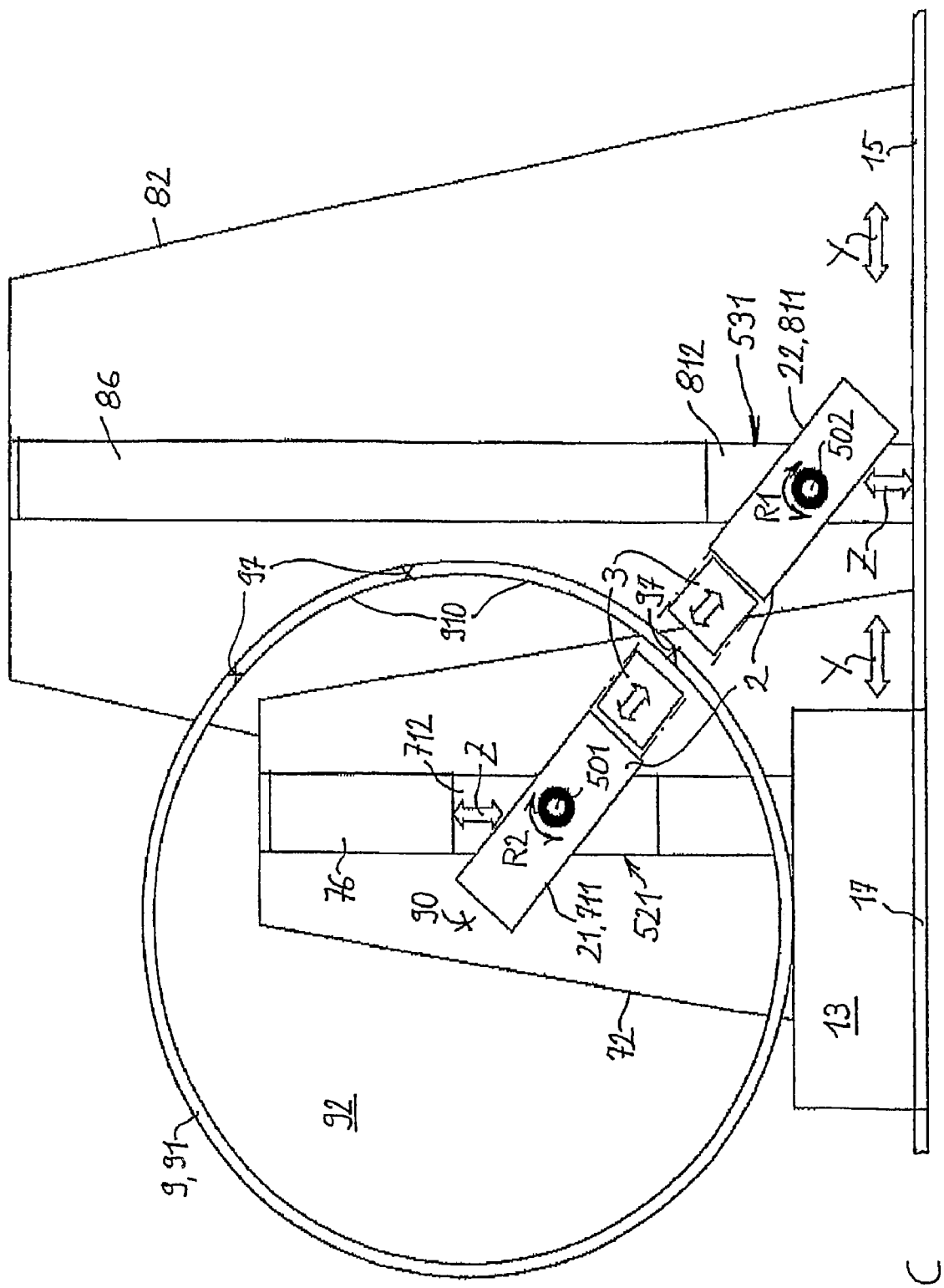

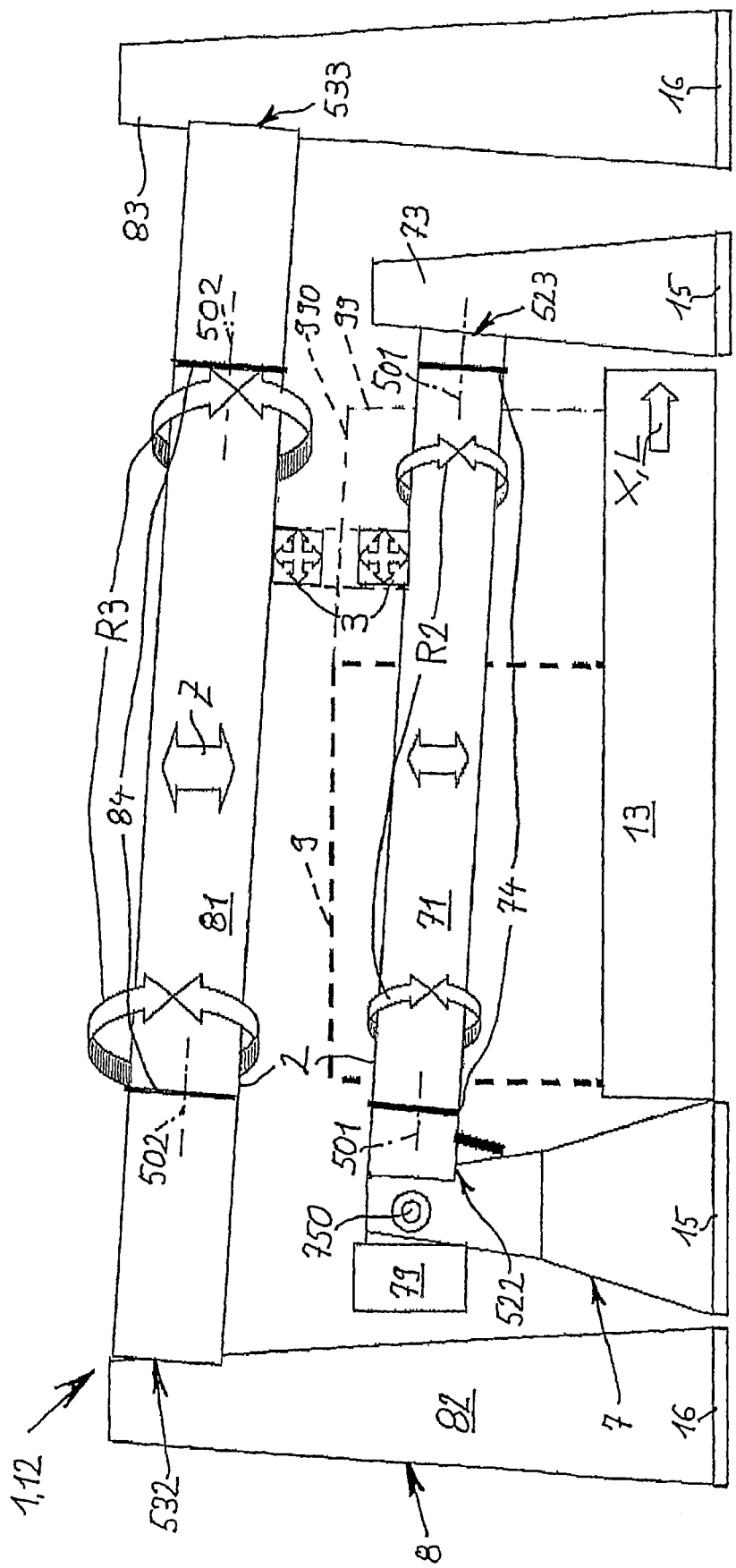

ASSEMBLY DEVICE FOR CONNECTING CUP-SHAPED LONGITUDINAL SEGMENTS OF A COVERING BODY BY PLACING AT LEAST ONE LONGITUDINAL CONNECTING JOINT

FIELD OF THE INVENTION

The field relates to an installation device for connecting shell-shaped longitudinal jacket segments of a jacket body that forms a large component that extends longitudinally.

BACKROUND

Typically the jacket bodies are aircraft fuselages that are installed from a plural number of partially cylindrical prefabricated shell segments. The segments are placed in positions that determine the fuselage and are longitudinally joined by means of riveted seams. For the purpose of producing the riveted seams a group of tools are used that are arranged on movable tool units. Such units comprise, for example, tools for boring, countersinking, sealing, plugging, pressing and holding-up. Generally speaking, the device may be equipped with any desirable tools for producing connection seams or for processing corresponding connection points.

A generic automatic installation device as disclosed in U.S. Pat. No. 4,662,556 comprises mounting carriages that carry tool units, wherein mounting carriages are arranged so as to be movable on rails in longitudinal direction of the fuselage. In one example, with the stationary mounting carriage device, riveted seams may be placed only in one circumferential height position such that the fuselage body to be produced has to be displaced so that it can be completed with further segments. Another installation device, known from U.S. Pat. No. 4,662,556, produces riveted connections comprises a rail scaffold that has been formed according to the circumferential contour of the fuselage. Carriages that guide and move a beam that carries an outside tool, said beam extending along the fuselage length, run on curved rail sections. For the purpose of processing a riveted seam in a circumferential height position the longitudinal beam is attached to the fuselage, and riveting counter-tools in the interior of the fuselage are connected to the longitudinal beam by way of pins placed through the fuselage shell. Undesirable forces are introduced into the component to be produced. While the installation device makes it possible to produce longitudinal riveted seams in different circumferential positions of a semi-fuselage, setting up and retooling are however particularly time consuming and labor-intensive. The curved rail guide has to be constructed depending on the dimension and shape of the fuselage to be produced, so that the device can only be set up and used for a single design type. The overall construction is expensive and only covers half the circumference of the fuselage.

SUMMARY OF THE INVENTION

An automatic installation device may be relatively simple in its construction and is to be usable for producing longitudinally-segmented jacket bodies of various diameters or forms. The longitudinal connection seams may be processed and produced at the largest possible circumferential angle region on the body jacket in the desired circumferential position. The effort required for set-up and installation is reduced, and the time and expenditure involved in production may be reduced correspondingly.

The object of the invention is met in conjunction with the features of the installation device mentioned in the introduction in that the The installation device comprises a carrier pair that is formed by an inner guide carrier that extends in longitudinal direction in the hollow space of the jacket body., which The inner guide carrier movably guides an inner tool., as well as being formed by an An outer guide carrier extends in longitudinal direction outside the jacket body., which The outer guide carrier movably guides an outer tool., wherein each Each guide carrier may be rotationally held and fastenable on at least one longitudinal rotary axis that is operably oriented according with respect to the outer longitudinal contour of the jacket body, as well as being held and fastenable in at least two separate spatial directions extending across the longitudinal direction. such that Thus the tools that interact are capable of interacting as a pair for the purpose of producing a connection seam., selectively take The tool pair takes up different positions on the longitudinal circumference of the jacket body.

According to one example of the invention, the tools that work towards each other as a pair are movable by rotation on associated longitudinal axes as well as by means of independent displacement in at least two directions across the longitudinal axis of the body to desired circumferential positions on the jacket of the body to be produced. By means of rotary adjustment of the tool guide carriers, the working axes of the tools may be aligned in the desired height position/circumferential position to the region of the jacket segments to be connected. Alignment is provided by the tool positioning. In particular, riveting tools work in a working alignment at a 90° angle in relation to the generated surface on the seam position, for example.

The device is particularly suitable for this application because the circumferential positions/height positions may be slidably set while the operating angle positions may be set in a rotatory manner without mutually influencing each other. This demonstrates that the device is universally usable for producing hollow jacket bodies of various sizes and cross-sectional shapes because the tool pair or the tool pairs may practically be moved to any desired height position and circumferential position. In particular, one and the same installation device may be provided for producing fuselages of various aircraft types. There is no longer a need to construct devices for each size type and/or shape type. Machining costs, setting-up costs and production times are significantly reduced. Furthermore, the degree of automation for producing hollow jacket bodies with segment parts may be increased because connection seams may be produced with free tools in one and the same manner. There is no longer any need to carry out conventional manual setting-up and installation work.

In one example, each tool guide carrier is rotatably displaceable on the associated longitudinal rotary axis and is displaceable to and fro in two separate transverse directions that are arranged perpendicularly in relation to each other. In this way the tools, direction by direction, can by brought into the Y-direction and the Z-direction of a cartesian coordinate system in the desired height position and circumferential position, and by rotary adjustment, for alignment of their working axes, can be set precisely in relation to the surface of the jacket segments to be connected.

an installation may be used for producing bodies whose longitudinal segments are partially cylindrical. Likewise, hollow jacket bodies of a diameter that differs from the cross-section of the cylinder may be produced without further equipment and set-up costs. In particular, bodies with changing profile cross sections, such as conical longitudinal sections, be produced. The tool guide carriers may be held in such a way that they are rotatable on longitudinal rotary axes that are oriented according to various outer longitudinal contours of the jacket body.

One embodiment consists of the installation device comprising a carrier frame that extends in longitudinal direction. The carrier frame forms a carrier pair and is rotatably held on a bearing axis that preferably coincides with a longitudinal symmetry axis of the carrier frame. The bearing axis forms a common longitudinal rotary axis for the two tool guide carriers. This embodiment provides an advantage in that the inner tool guide carrier and the outer tool guide carrier are mechanically integrated in a single body, namely in the carrier frame. Expediently, the carrier frame is closed so as to optimize both force introduction and force distribution. This results in a tool working system that is non-positive per se, such that the tools that work towards each other as a pair are mutually supported and force balanced, optimally.

On the one hand, relatively great forces may act on the tools. This is particularly advantageous with the use of squeezing tools that join dural rivets or similar rivets, so as to prevent any introduction of force into components to be connected that might cause distortions. Dural rivets are economical and do not require preformed holes. Also the tolerance of the tool centre point is relatively large. In this way, excellent riveting rates are achieved during production. On the other hand, components such as the carrier frame, the bearings, mounting parts and/or tool carrier heads that hold said carrier frame may be dimensioned so as to be smaller, if forces are balanced optimally. By integrating the tool guide carriers in the carrier frame, the overall construction is relatively simple. A mounting that holds the carrier frame, as well as the bearing arrangement are arranged in a space-saving manner with a minimum number of components.

In particular, with the device according to one example of the invention, it is possible to place connection seams to jacket bodies that are completely closed on the circumferential side. With a design according to one example of the invention this may also be achieved with a closed carrier frame. In one example, such a carrier frame at its faces comprises the frame webs that connect the two guide carriers, which frame webs are rotatably held by at least one longitudinal axis of the carrier frame, and on at least one frame end, the frame web is detachably connected to the frame guide carriers so that said frame web in the detached state may be moved to a position that provides access to a front space in front of the inner guide carrier. Expediently, the carrier frame may be opened in that the detachable frame web may be completely detached from the frame and by means of a column-like mounting part may be moved to a position that leaves free space in order to place the open-faced and circumferentially closed jacket body in a preassembled form, or part of said jacket body, from one face into the device, or to remove it from there. Expediently, at its face that remains closed the carrier frame is provided with a weight mass that generates a counterbalance weight so as to hold the carrier frame in position in the state where the frame web is completely separated from the frame guide carriers.

In order to be able to place a longitudinal seam also in jacket bodies whose profile cross section varies, in one example the device expediently provides for the carrier frame to be held in such a way that it may be relocated as desired to at least two positions in which each of the frame guide carriers is aligned according to the different outer longitudinal contour of the jacket body. Advantageously, a bearing device that holds the carrier frame is provided, which bearing device on the frame webs in their direction of extension comprises curved, e.g. convex, bearing sections, as well as corresponding, e.g. concave, bearing sections that accommodate said convex bearing sections.

In one example, two column-like mounting parts are provided, between which the carrier frame is arranged. The carrier frame is held on the mounting parts so as to be rotatable on a longitudinal axis. The column-like mounting parts are arranged so as to be mutually movable in particular on rails across the longitudinal direction of the jacket body, in at least one first spatial direction. In order to hold the frame carrier such that it is height-adjustable in a particularly simple manner, one embodiment of the invention provides for the column-like mounting parts to carry bearings that hold the frame carrier and that are adjustable in spatial direction across the longitudinal direction of the jacket body as far as the column height of the mounting parts is concerned.

According to a further embodiment of the invention, instead of the frame that integrates the tool guide carriers, a device comprising an inner portal device and an outer portal device is provided. The inner portal device holds at least one inner guide carrier, while the outer portal device holds at least one outer guide carrier, wherein the inner guide carrier is rotatably adjustable on a longitudinal rotary axis of the inner portal device, while the outer guide carrier is rotatably adjustable on a longitudinal rotary axis of the outer portal device, which rotary axis expediently is substantially parallel to the inner portal longitudinal rotary axis. Expediently, in each case, the inner portal device and the outer portal device comprise two column-like mounting parts, between which in each case the associated portal carrier is arranged and on which mounting parts, the associated portal carrier is held, wherein the column-like mounting parts of each portal device are arranged so as to be movable in at least a first spatial direction across the longitudinal direction of the jacket body and are arranged so as to be fastenable, and carry rotary bearings, each of which holds the portal carrier, and in at least one second spatial direction across the longitudinal direction of the jacket body are adjustable as far as the column height of the mounting parts is concerned.

In order to bring a circumferentially closed prefabricated jacket body or part thereof from a face to the installation device, or in order to remove said jacket body from there, according to one embodiment of the invention, the inner portal device comprises a first column-like mounting part on which the inner portal carrier is pivotably held in the direction of the column height. The portal device also comprises a second column-like mounting part on which the inner portal carrier is held so that it can be lifted off for pivoting removal, wherein the second column-like mounting part may be moved across the longitudinal direction of the jacket body to such an extent that the facing space in front of the inner portal carrier is released.

In the embodiment according to one example of the invention, with the two portal devices too, special means may also be provided in order to place longitudinal seams on sections with varying longitudinal contours or with different cross sectional profiles. To this effect, on the above-mentioned column-like mounting parts of the inner portal carrier device and of the outer portal carrier device height-adjustable and arrestable support bearings for the portal carriers are arranged in such a way that the portal carriers in substantially parallel position in relation to each other may selectively be moved to at least two positions that are adaptable to the various longitudinal contours.

Subordinate claims deal with the above-mentioned and with further expedient and advantageous embodiments of the invention. Particularly expedient and advantageous embodiments or embodiment options of the invention are described in more detail with reference to the following description of the exemplary embodiments shown in the diagrammatic drawings.

BRIEF DESCRIPTION OF THE DRAWINGS

These drawings are merely examples and illustrations used in describing embodiments of the preset invention and should not be used to limit the claims.

FIGS. 6A to 6C show a front view of setting positions of the installation device of FIGS. 1 to 5;

FIG. 7 shows a profile view of tool setting positions of an installation device on hollow jacket bodies of different circumference.

FIGS. 10 and 11 show a longitudinal view and top view of the example of FIGS. 8 and 9.

FIG. 13 shows a longitudinal view of a setting position of the example of FIGS. 8 to 12.

DETAILED DESCRITPION

Figure 1:
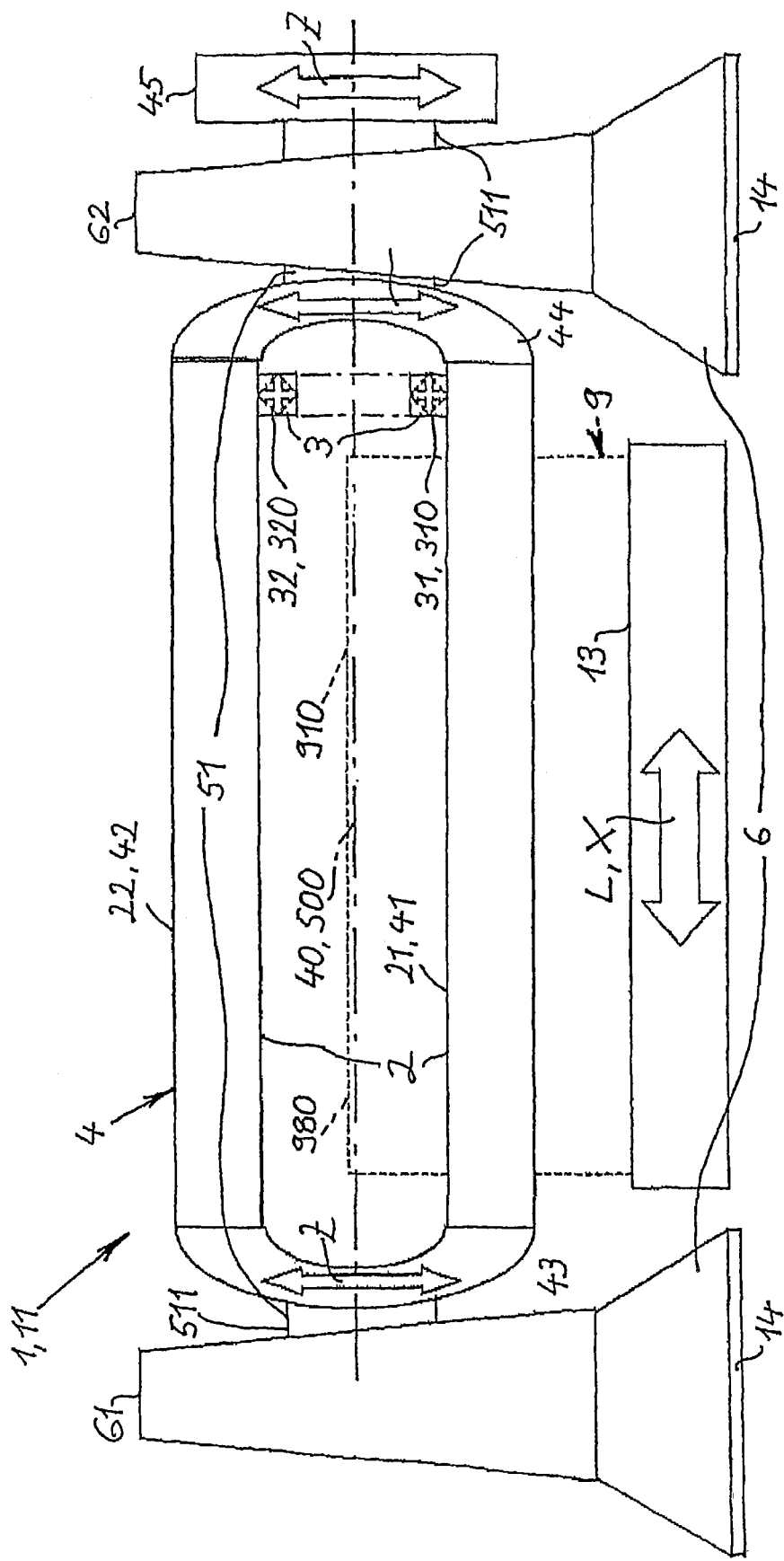
FIGS. 1 and 2 show a longitudinal view of one example of an installation device.

The detailed description provides some examples of the present invention, but the invention should not be limited merely to these examples. Instead, the present invention should be limited only by the claims that may eventually issue. Many variations in the invention, changes in specific components of the invention and uses of the invention will be readily apparent to those familiar with the field based on the drawings and description provided.

An installation device 1, 11 according to one example of the invention, illustrated in FIGS. 1 to 6, comprises a mounting 6 with a tool frame-carrier 4 held on it. Two mounting parts that are movable, either separately or together, as desired, in the Y-direction on rails 14 are designed as columns or towers 61, 62 that extend in the height direction Z. The carrier frame 4 extends in the direction of the third cartesian coordinate X and by way of end pieces 43, 44 that form frame webs is slidable in height direction Z, and is rotationally held, on a center axis and symmetry axis 40 of the frame carrier, to the towers 61, 62 by means of the bearing device 51. The installation device 11 is used for joining partially cylindrical shell-shaped longitudinal segments 910 by placement of longitudinal riveted seams 97 to a jacket body, closed on the circumference, with open faces in the form of a fuselage 9, as shown in FIGS. 6A to 6C. These figures show the fuselage 9 of an aircraft, which fuselage has a circular cylindrical profile cross section. In the interior, the fuselage 9, at approximately half its height, is divided into an above floor area and an underfloor area by means of a horizontal floor 93. The fuselage 9 with its cylindrical axis 90 extends in the X-direction. The longitudinal direction L of the installation device 11 as well as the longitudinal direction of the fuselage 9 are mutually determined by the X-direction.

Figure 6C:
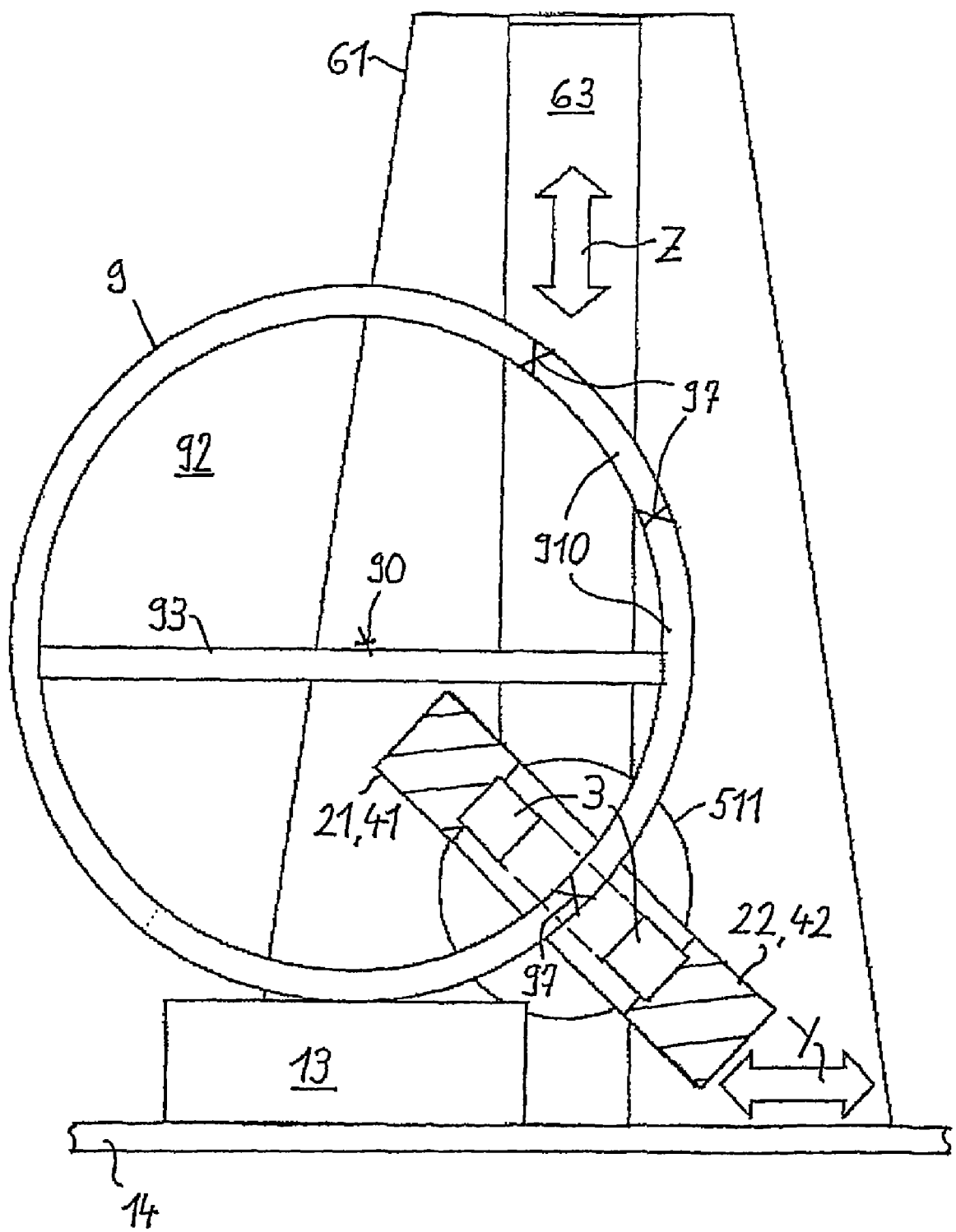
Figure 8:
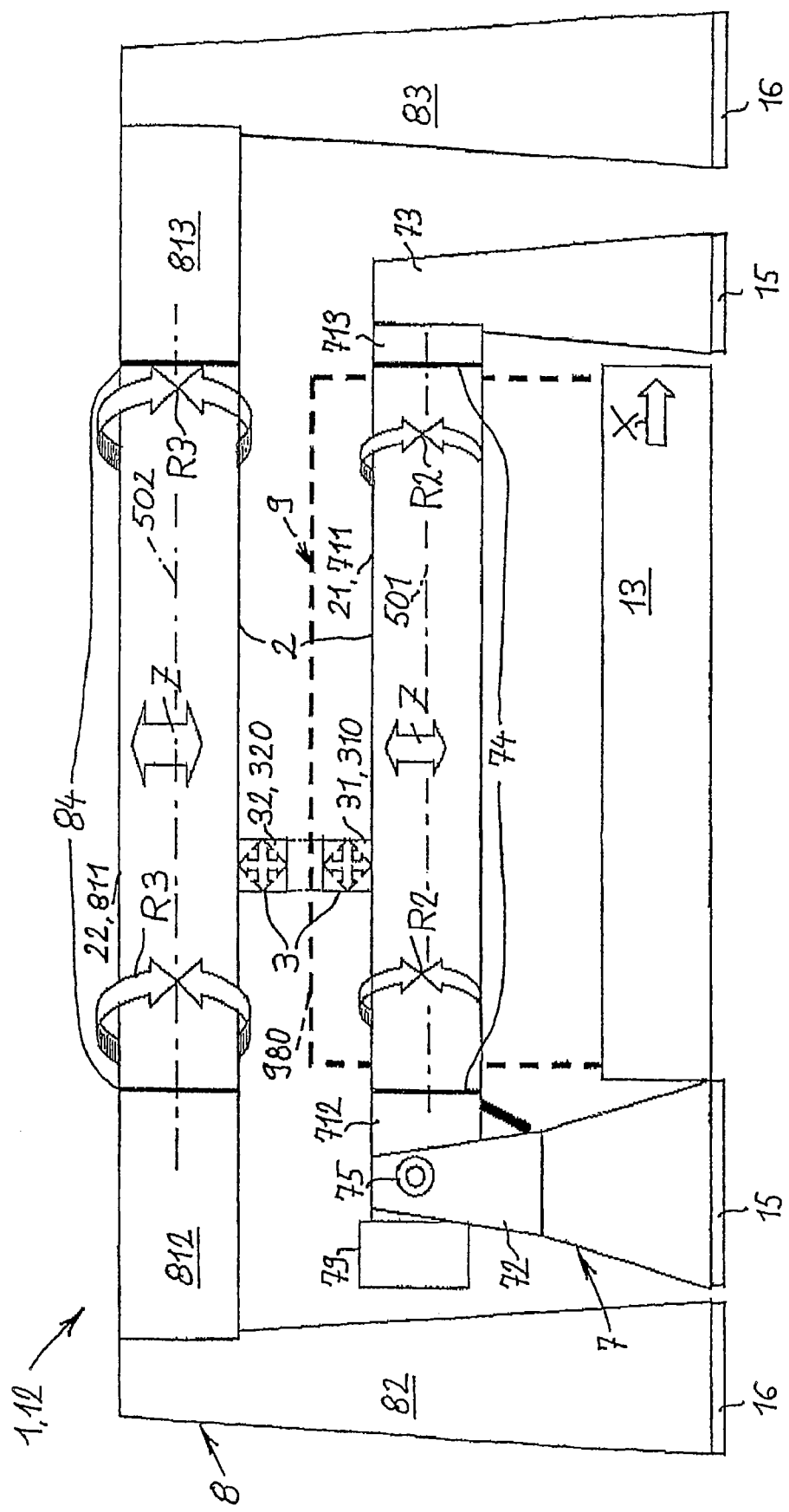
FIGS. 8 and 9 show a longitudinal view and top view of another example of of an installation device.
Figure 9:
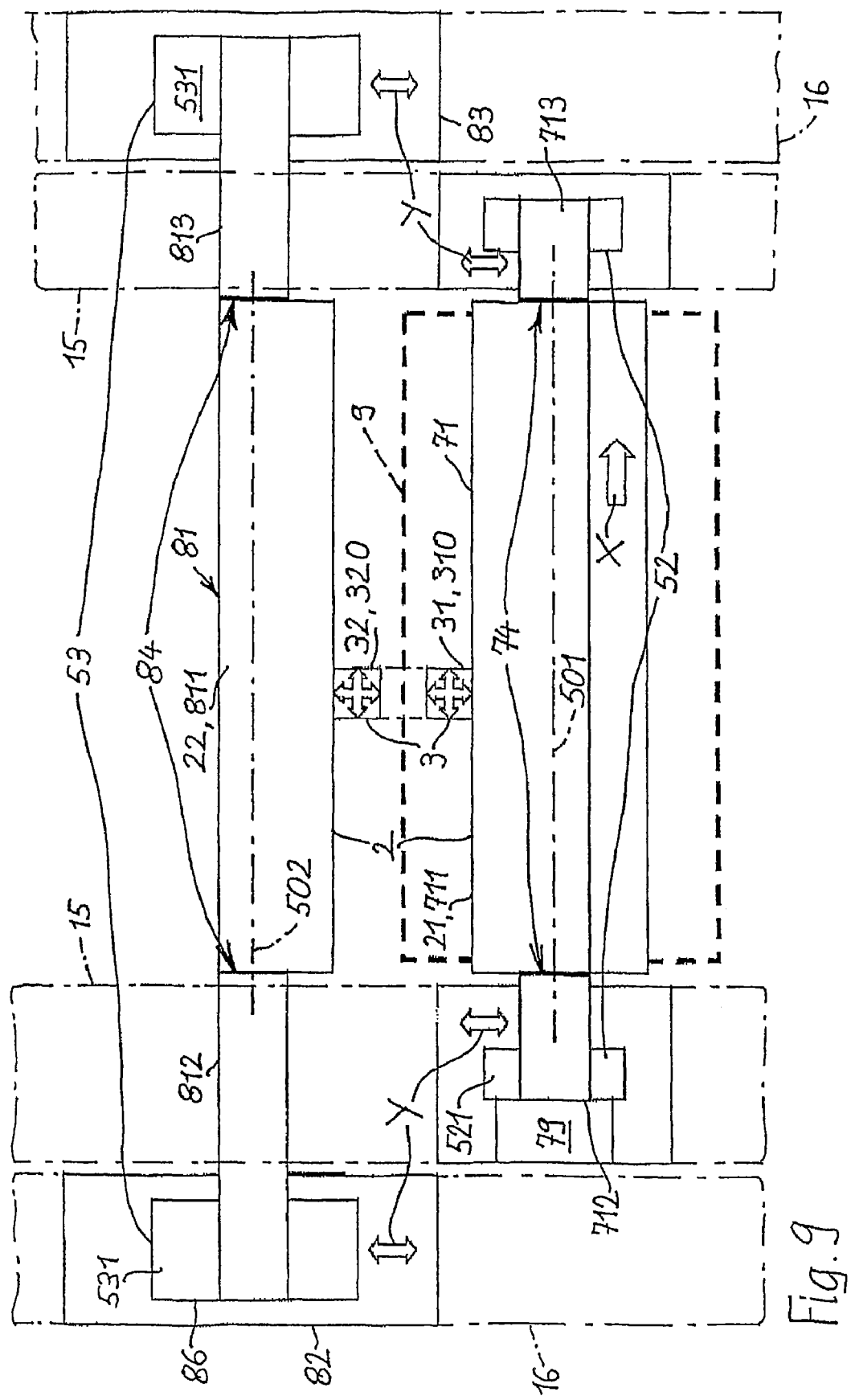

To install the fuselage 9, it is prefabricated in the shape shown in FIGS. 6A to 6C and in a way that will be described in further detail is placed in the installation device 11 on a component carriage 13, which, for example, is movable along a guide 17 in the X-direction. In this state, the longitudinal segments 910 of FIGS. 6A to 6C show lateral sections—are bonded together at their longitudinal margins. In order to complete this longitudinal connection, the longitudinal riveted seams 97 are produced at the overlapping positions. Such riveted seams are produced in a way that is known per se by inner tools 31 and outer tools 32 that work towards each other as a pair and are movable across the longitudinal direction L of the body. The work units or tool units comprise in particular tools for boring, countersinking, sealing, plugging, pressing and holding-up, which tools for the purpose of carrying out the individual work steps are automatically selected, moved and activated. For example, each of the riveted connections which in FIGS. 6A to 6C in the overlapping position of the segments 910 are diagrammatically represented by the character X, comprises three longitudinally substantially parallel riveting lines.

According to one example of the invention, the installation device 11 comprises a carrier pair 2 that is formed by an inner guide carrier 21 which in the hollow space 92 of the fuselage 9 extends in the X-direction and movably guides an inner tool carriage 310, as well as a by an outer guide carrier 22 which extends in the X-direction and movably guides an outer tool carriage 320. In the exemplary embodiment of FIGS. 1 to 6 the carrier pair 2 is formed by the carrier frame 4. Longitudinal parts 41, 42 of the frame 4, which longitudinal parts 41, 42 extend substantially parallel to the straight longitudinal contour 980 of the fuselage 9, form the two guide carriers 21, 22, which at their faces are non-positively connected to the end pieces 43, 44. The frame 4 or the frame guide carriers 41, 42 are of such a length that the longitudinal path of each tool carriage 310, 320 covers the full length of the fuselage 9 to be processed. Furthermore, the tool carriages 310, 320 as a pair are arranged so that they are movable towards each other so that a multitude of tools 31, 32 for producing the riveted seam 97 be moved from the inside or the outside to the jacket wall 91 of the fuselage 9, where they work towards each other with automatically selected tools for the purpose of processing the seam. For this purpose, individual tools 31, 32 are locally also movable on the tool carriages 310, 320 in longitudinal direction and in cross direction.

The frame bearing device 51 comprises a pair of rotary-ring bearings 511. Each bearing 511 is height adjustable and arrestable on the associated tower 61, 62 in a vertical groove 63 in the Z-direction. In order to hold the carrier frame 4 with the end pieces 43, 44, the two rotary-ring bearings 511 in the Z-(height) direction and the Y-direction are moved to corresponding positions. In each Y, Z-position, the frame 4 is rotatable on its centre longitudinal axis 40 that coincides with the rotary axis 500 of the bearing device 51. Correspondingly the inner tool guide carrier 21, 41 and the outer tool guide carrier 22, 42 are rotatably held on one and the same longitudinal rotary axis 500. By rotating the frame 4 on the rotary axis 500, opposing tool carriages 310, 320 that are aligned with each other, or tools 31, 32 that oppose each other as a pair 3 are movable by a single rotary adjustment movement to any desired rotary angle position. In combination with the mutual movability of the towers 61, 62 of the mounting 6 in Y-direction, as well as the mutual height adjustability of the rotary-ring bearings 511 in Z-direction, the frame 4 may be moved to any desired height position or circumferential position on the fuselage jacket 91, as is shown in FIGS. 6A to 6C, wherein by rotary adjustment of the frame 4 in the direction R1, the tool carriages 310, 320 or their tools 31, 32 may be placed in a working direction that is aligned so as to be substantially perpendicular in relation to the generated surface of the fuselage 9. This positioning is achieved by the independent adjustment paths that are set up in the Y-direction, Z-direction and R1-direction. In the device 1, the two to-and-fro movements as well as the rotatory movement are carried out by automatic control according to the size and shape of the fuselage 9, as well as according to the circumferential position of the riveted seam to be placed. In each of the set tool working positions, the towers 61, 62 or the bearings 511 are arrested with the usual means (not shown).

FIGS. 6A to 6C show two working positions in the above floor area and one working position in the underfloor area of the fuselage 9. In each case, a riveted connection seam 9 is produced in that the two tool carriages 310, 320 are moved to and from the firmly set positions of the tool guide carriers 41, 42 alongside them as a pair, wherein the individual work processes of the tools 31, 32 that are guided in pairs towards each other are automatically controlled, selected, activated and and carried out.

To demonstrate the universal use of the installation device 1, FIG. 7 shows cylindrical fuselages 9 of different size and shape with guide carrier pairs 2 or tool pairs 3 that are moved to selected processing positions 191 to 198. The figure shows that with one and the same installation device 1, the processing positions with 90° tool positions for example may be set up on fuselage bodies with circular cross sections of widely different sizes and on jacket bodies that are oval in cross section. For example, smaller fuselages have diameters of less than 4 m, while larger fuselages have diameters of more than 7 m. With the automatic riveting machine according to one example of the invention, longitudinal seams may be placed on any desired circumferential position, on cylindrical components as well as on jacket bodies that are non-cylindrical of any diameter and shape.

In order to provide one and the same installation device 1 according to one example of the invention for a wide spectrum of applications, the automatically movable and adjustable parts of the device will be designed and implemented such that the pair 2 of the guide carriers 21, 22 is relocatable along a circumferential section of the jacket, which section corresponds to a circumferential angle of at least 200° to 300°.

The fuselages shown in FIGS. 6 and 7 comprise a central floor 93, or in the exemplary embodiment of the oval fuselage, comprise two floors 95, 96. In order to be able to move the pairs 2 of guide carriers or the pairs 3 of tools on such fuselages 9 in any floor region to the desired height position, a change in plane has to be undertaken. For this purpose, the fuselage 9 must be moved out of the region of the carrier pair 2 or of the frame 4 and, after a change in the height position of the carrier pair 2, must be moved into the new floor region. The measures that are required for this, which measures are also provided in order to move into the device 11, the circumferentially completely closed fuselage 9 that is open at the faces, are described below in the context of the exemplary embodiment.

Figure 2:
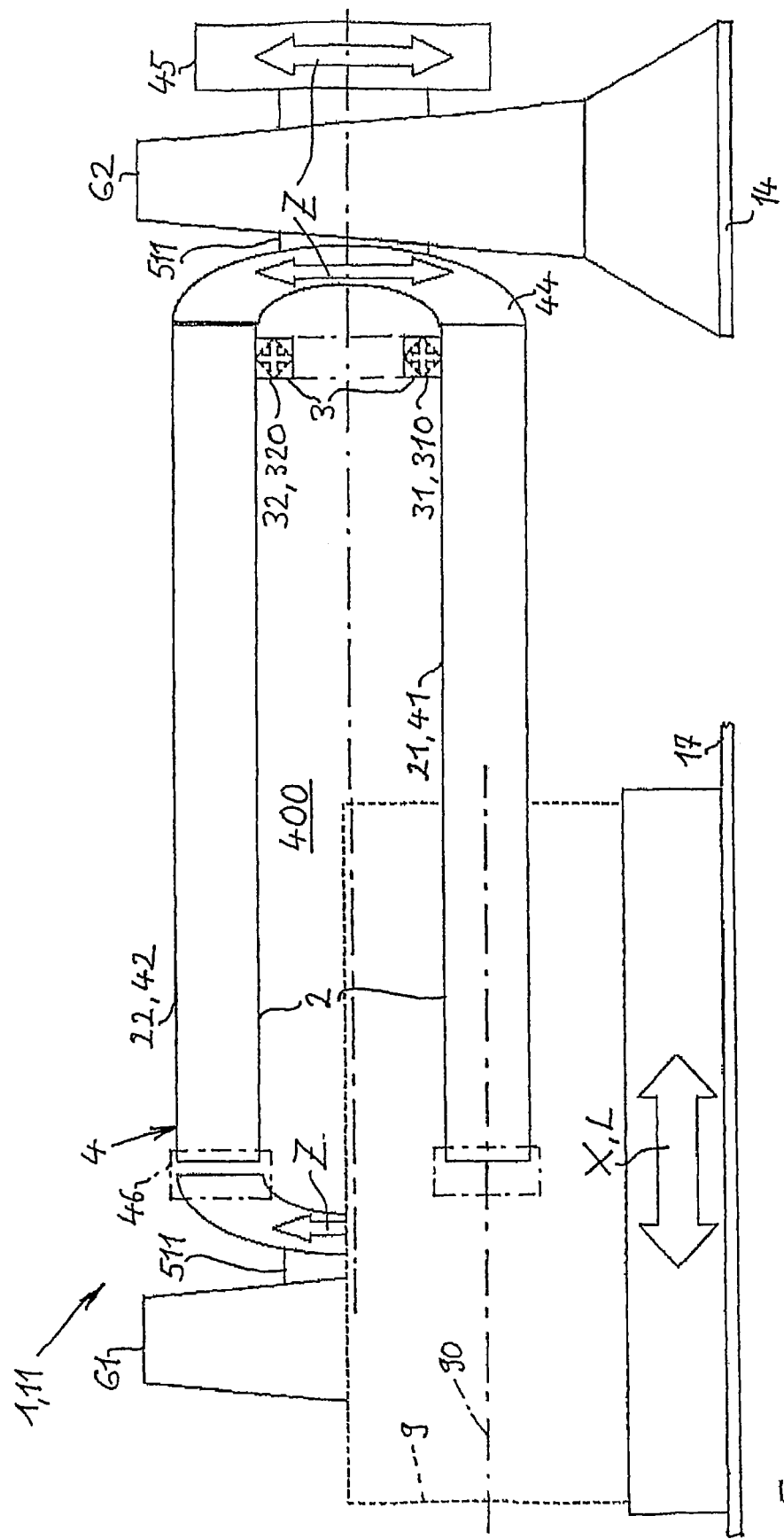
Figure 3:
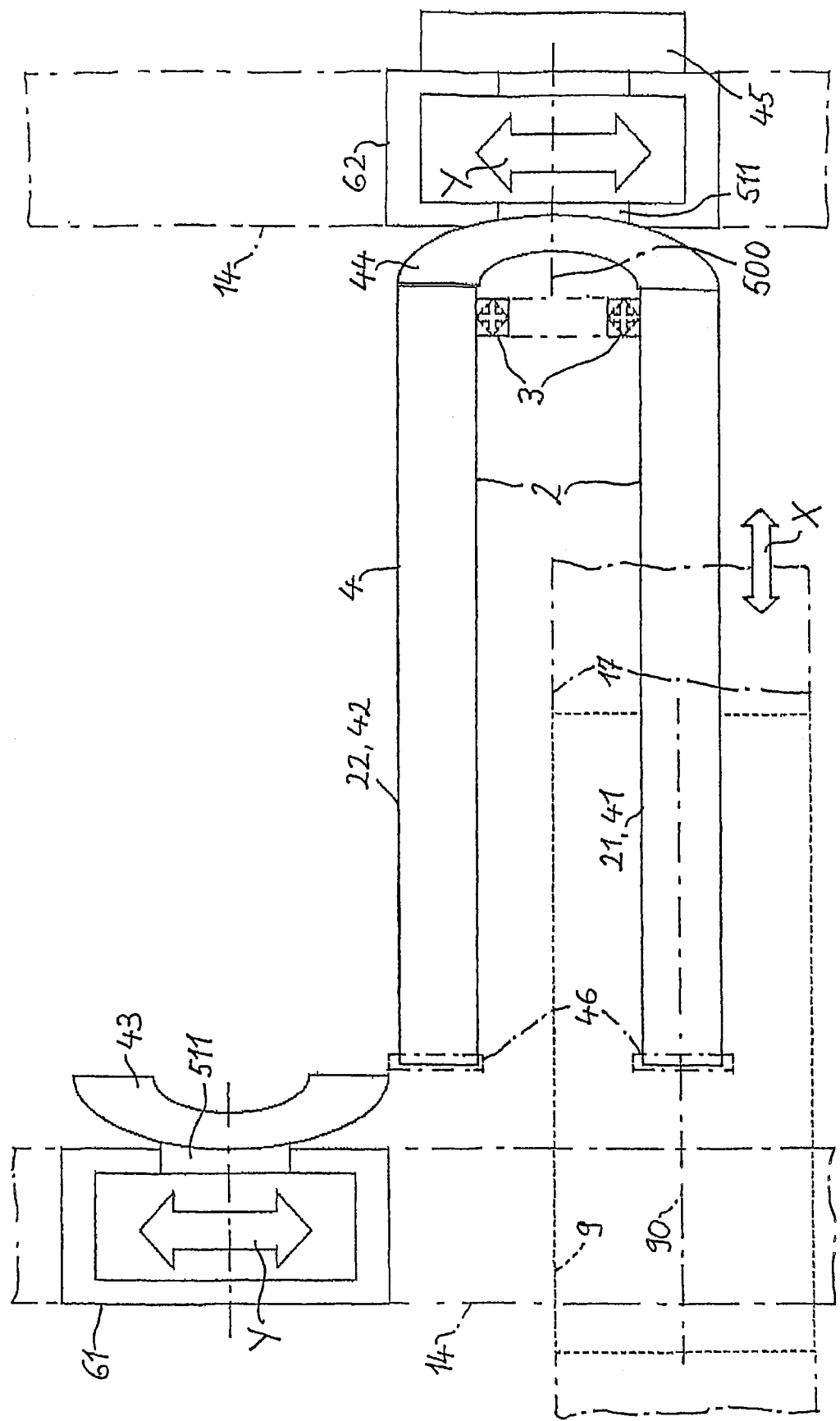
FIG. 3 shows a top view of a setting-up position of the example of FIGS. 1 and 2.
Figure 4:
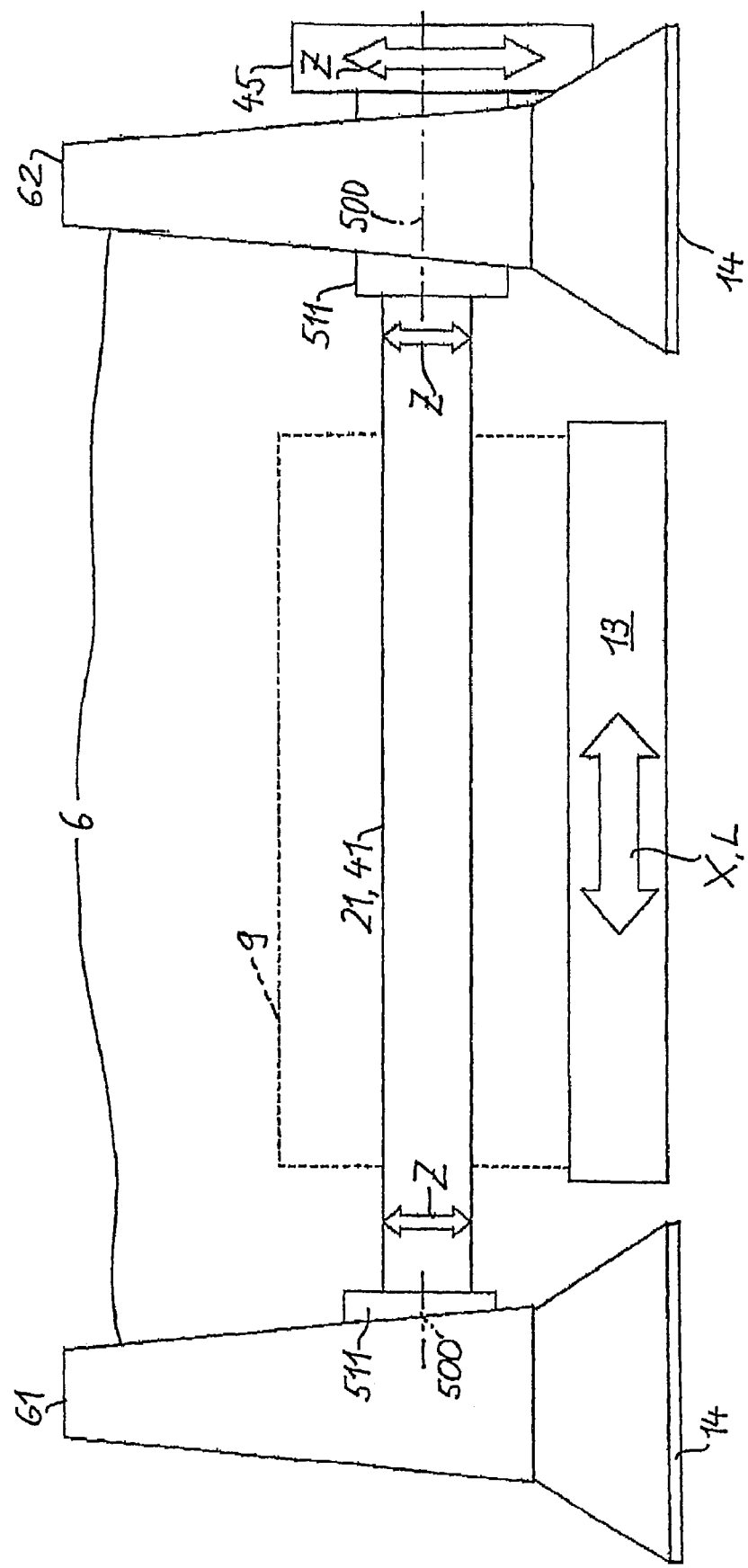
FIGS. 4 and 5 show a longitudinal view and top view of the example of FIGS. 1 to 3 in a setting position.

As shown in FIGS. 2 and 3, the frame end piece 43 is detachably attached to the frame guide carriers 41, 42. The end piece 43 that is decoupled from the guide carriers 41, 42 is moved in the Y-direction by means of the tower 61, wherein the end piece 43 remains connected to the bearing 511. For attachment of the end piece 43 to the frame guide carriers 41, 42, any detachable mechanical connection-means that establishes a non-positive connection may be considered. In this arrangement the connection is established in that the towers 61 and 62 remain arranged at a fixed distance from each other in the X-direction.

In FIG. 2, the frame 4 with the guide carriers 41, 42 is in a vertical position that corresponds to the Z-direction. The tower 61 with the end piece 43 decoupled from the carriers 41, 42 is moved back in the Y-direction so that the frame 4 that remains in elongated U-shape in front of the open face end is completely free. The jacket 91 of the fuselage 9, which fuselage 9 circumferentially is completely closed and which fuselage 9 rests on the component carriage 13, by longitudinally moving the carriage 13 in the X-direction is moved between the frame guide carriers 41, 42 or conversely is moved out of such a position. In the top view of FIG. 3, the frame 4 is shown in a horizontal position that corresponds to the X-Y-plane. It is evident that the tower 61 with the end piece 43 is moved in the Y-direction to such an extent that the circumferentially closed fuselage 9 may comfortably be moved freely over the inner tool guide carrier 41.

In order to change the height plane of the inner tool guide carrier 41, after moving the fuselage 9 out of the region of the frame 4, the two end piece bearings 511 on the towers 61, 62 are moved to the same desired extent in height in the Z-direction and are positioned. In this procedure the rotary position of the end piece 43 and of the open U-frame part on the rotary axes of the bearings 511 remains so that the frame 4 in a simple way is closed again in that the tower 61 is moved back to the y-position that corresponds to the tower 62.

In the exemplary embodiment of FIGS. 1 to 6, the rotary bearing 511, which is height-adjustable in Z-direction, on the tower 62 is connected to a weight mass 45 in such a way that a counterweight which counterbalances the weight of the U-frame part acts to hold the U-frame part with favorable force distribution to the bearing of the tower 62 in its cantilever position.

Figure 5:
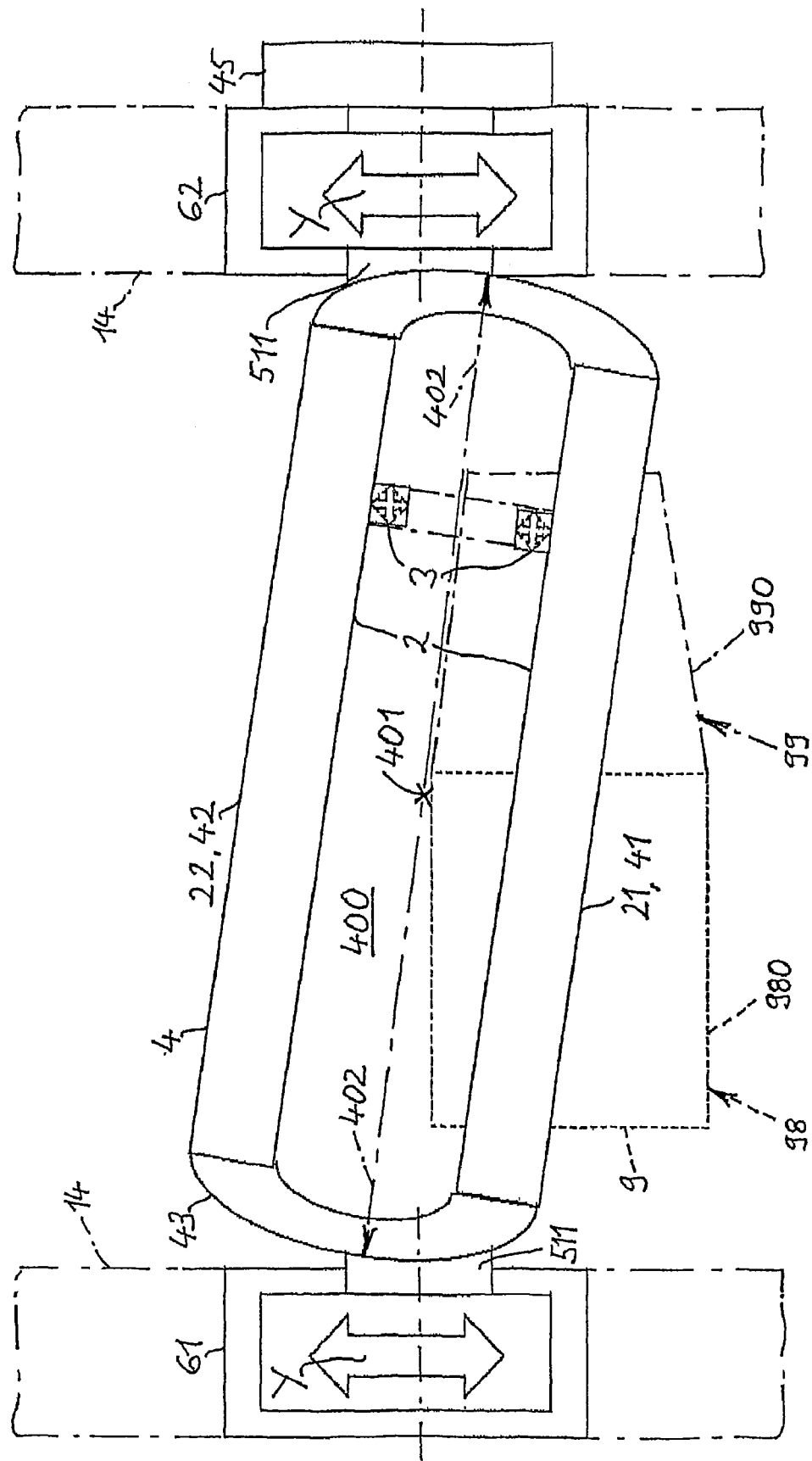

As shown in the top view in FIG. 5, the parallel tool guide carrier 41, 42 of the frame 4 is aligned in a direction that corresponds to the longitudinal contour 990 of a conical end section 99 of a fuselage 9. This means that the guide carriers 41, 42 and the straight contour line of the conical section 99, whose circular diameter becomes smaller towards the end, are aligned in parallel. With the installation device 11 it is not only possible to produce and process longitudinal seams on a straight fuselage section 98 with a contour 980 that extends substantially parallel to the X-direction, but also on a three-dimensional spatial section that extends at an angle in relation to the X-direction. To this purpose, the plane carrier frame 4 in a frame plane 400 that is common to all components 41 to 44 is arranged so as to provide rotary adjustment on a central axis 401 that is substantially perpendicular to the frame plane 400.

Depending on corresponding height positions of the bearings 511 in the Z-direction, the frame plane 400 comes to rest in horizontal planes. Each end piece 43, 44 on its side facing the bearing 511 comprises a convex circular segment which is determined by a radius 402 on the axis 401, which radius is situated in the area 400. Correspondingly, each bearing 511 comprises a convex matching bearing shell in order to accommodate the associated end piece 43, 44 in the plane 400 so that it is rotatably pivotable on the axis 401.

In order to set up the position of the carriers 41, 42, which position matches the straight inclined contour, the frame 4 with the towers 61, 62 is first moved in a linear way in the Y-direction into the desired circumferential position and height position, with the towers 61, 62 aligned substantially parallel to the X-direction, and with the bearings 511 movable in a linear way substantially perpendicular to the Y-direction. By rotation on the rotary axis 500, the tool carriages 310, 320 in the set circumferential position are moved to a 90° working position in relation to the wall of the cylindrical section 98. By rotating the frame 4 on the axis 401, parallel alignment in relation to the contour 990 of the conical section 99 then takes place.

According to a further exemplary embodiment, in FIGS. 8 to 13, an installation device 1, 12 instead of the carrier frame 4 comprises an inner portal device 7 which holds an inner tool guide carrier 21 as well as comprising an outer portal device 8 that carries an outer tool guide carrier 22. The inner portal device 7 comprises two column-like mounting parts that are formed by towers 72, 73, which mounting parts hold a portal carrier 71 so that it is movable in height direction Z and so that it is adjustable. The portal carrier 71 is formed by an inner longitudinal section 711 that forms the guide carrier 21, as well as on the ends by bearing sections 712, 713, wherein the longitudinal section 711 is held by means of rotary-ring bearings 74, to the bearing sections 712 and 713 so as to be rotatable on a longitudinal rotary axis 501.

The outer portal device 8 is designed correspondingly. It comprises two mounting parts that form towers 82, 83, on which a portal carrier 81 is held so as to be movable and adjustable in height direction Z. The portal carrier 81 is formed by an inner longitudinal section 811 that forms the outer guide carrier 22, as well as by bearing sections 812, 813 at its ends. The central longitudinal section 811 is rotatably held to the end sections 812, 813 on a longitudinal rotary axis 502 by means of a rotary-ring bearing 84. The portal devices 7, 8 are separately movable in Y-direction on rails 15 or 16.

Apart from the fact that in the exemplary embodiment of FIGS. 8 to 13, the central longitudinal portal sections 711, 811 form the guide carriers 21, 22 that are substantially parallel to the straight longitudinal contour 980, the guide carriers 21, 22 with the tool carriages 310, 320 and the tools 31, 32 form a pair 2 of tool guide carriers as is the case in the previously described exemplary embodiment. For the purpose of producing riveted seams 97, for example the positions shown in FIGS. 12A to 12C may be reached and set, which positions correspond to the positions in FIGS. 6A to 6C. In order to set a working position for processing a seam 97 the tower pairs 72, 73 and 82, 83 are separately moved in the Y-direction and are spaced apart in a manner suitable for the desired position. By means of linear actuating movement, the portal carriers 71, 81 are moved in the Z-direction into height positions in which subsequently the longitudinal sections 711, 811 that form the longitudinal guide carriers 21, 22 are pivoted in the directions R2, R3 by rotary movement on the axes 501, 502 in order to mutually align the tool carriages 310, 320 with the tools 31, 32 as a pair 3 in a uniform direction of work at an angle of 90° in relation to the generated surface to be processed.

The portal carrier bearing sections 712, 713 or 812, 813 are held in bearings 521 or 531 that are movable and fastenable in height direction Z on the towers 72, 73 or 82, 83 in vertical bearing grooves 712 or 812, for example by means of threaded spindles (not shown).

In a circumferential region of approximately 270°, the tool carriages 310, 320 may be moved into their working positions, wherein only the region of the component carriage 13 that holds the fuselage 9 remains left open. For example, all the positions may be set on the fuselages in FIG. 7, which fuselages differ in size and shape.

Figure 10:
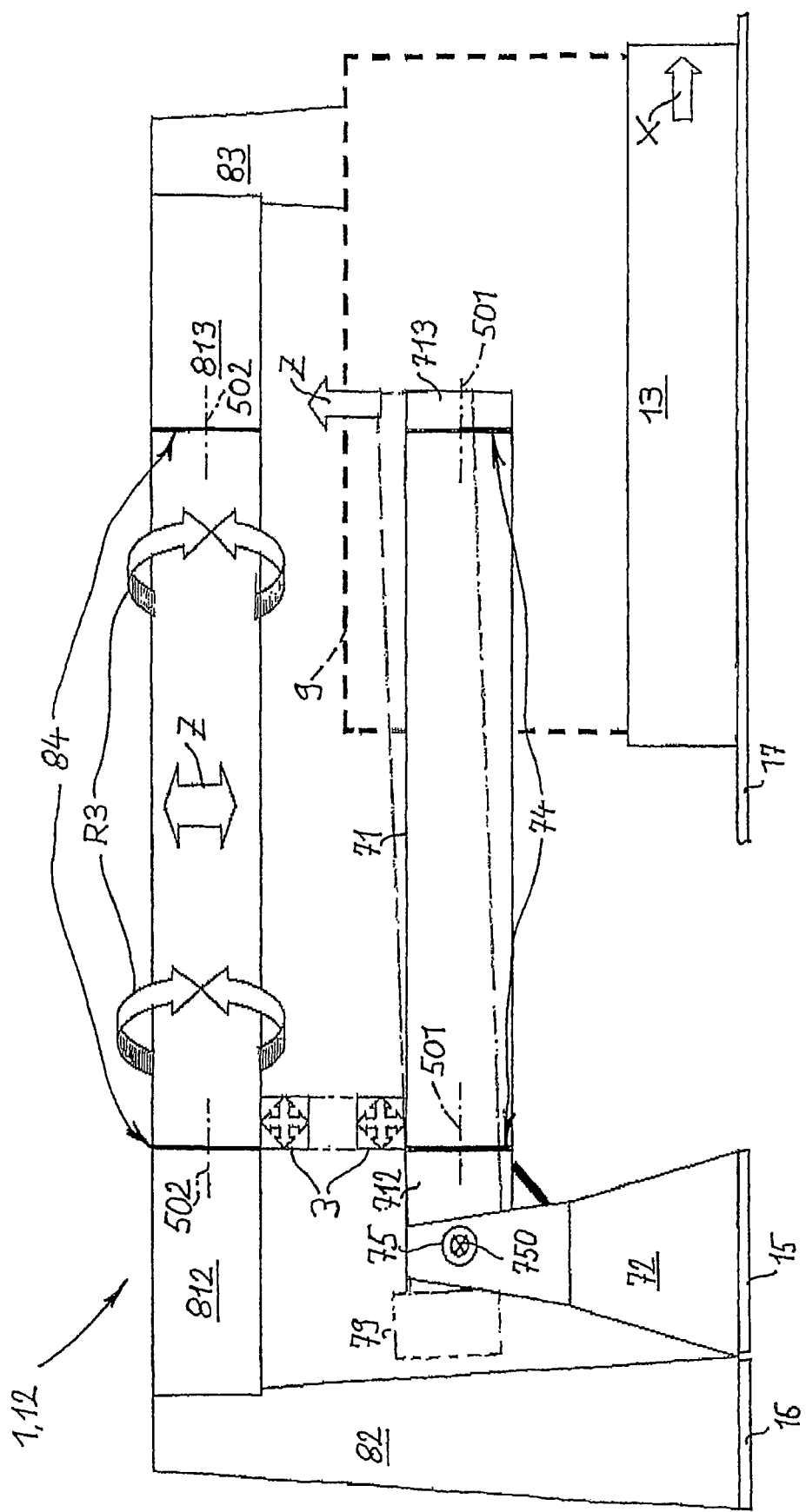
Figure 12:
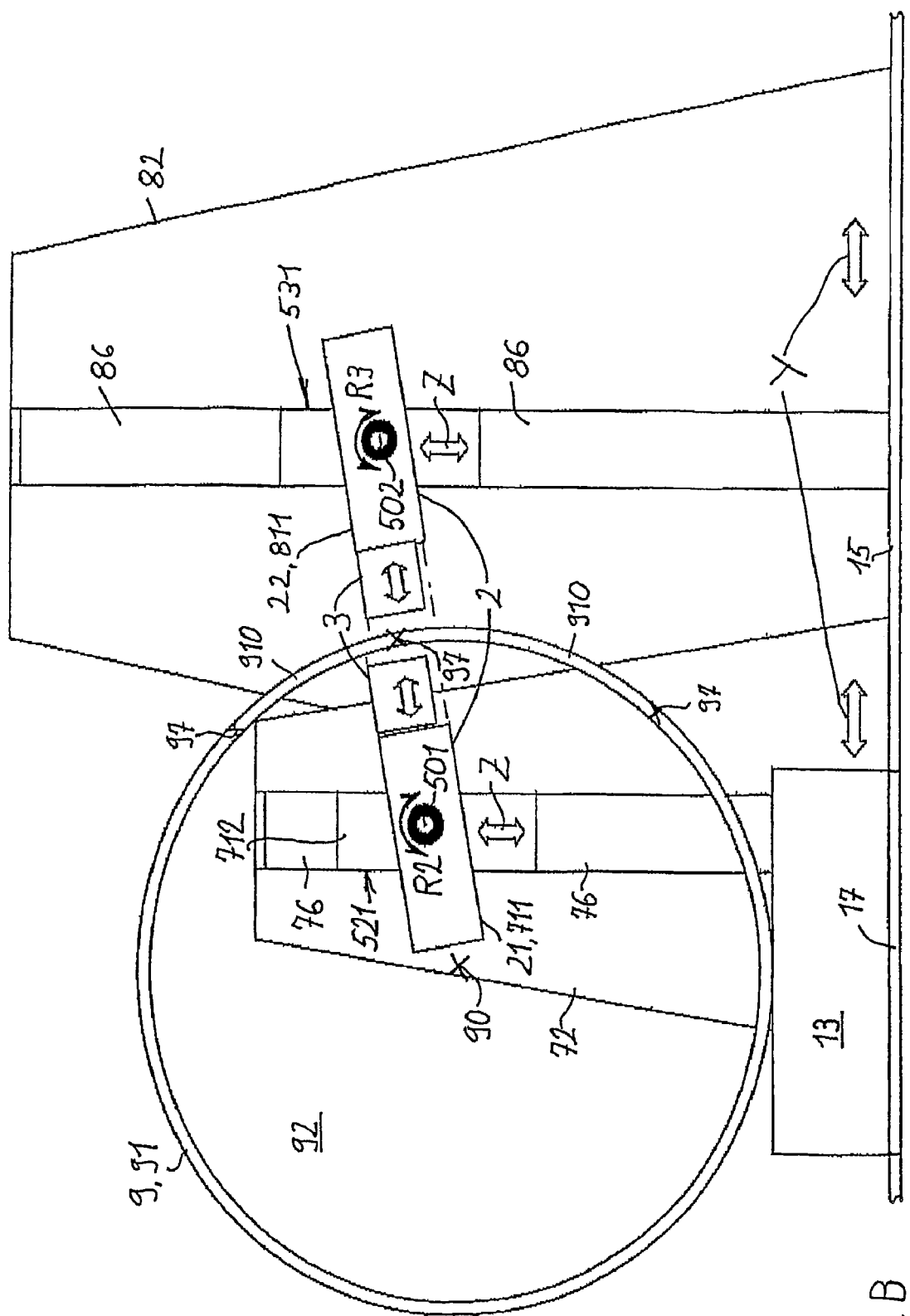
FIGS. 12A to 12C show a front view of setting positions of the example of FIGS. 8-11.

FIGS. 10 and 11 provide exemplary embodiments of designs of the installation device 12 for the purpose of moving the fuselage jacket body 9, which circumferentially is completely closed, into the device and removing it from the device, also in connection with the removal and insertion of a fuselage for carrying out a change in tool planes between the floor regions separated by floors 93, 94, 95.

The inner portal device 7 comprises the tower 72 which is provided as the main tower. On it the portal carrier 71 with a drag bearing 75 is pivotably held on an axis 750 that extends in Y-direction. In this arrangement, the rotary bearing 521 that holds the portal carrier 71 is designed so as to be rotatable on the axis 750, wherein the height adjustability of the bearing 521 on the tower 72 remains intact.

On its other end the portal beam 71 is connected to the tower 73 that forms a support tower. In order to free the space on the face in front of the portal carrier 71, the portal carrier 71, which for lifting is supported by the tower 73, is raised in the Z-direction by a few degrees, e.g. approximately 5°, by pivoting on the axis 750. As shown in FIG. 11, the freed support tower 73 is moved in Y-direction into a rear position. As a result of this, the inner portal carrier 71 becomes free for the placement and removal of a fuselage 9. For the purpose of changing plane, the free portal carrier 71 is moved to the desired height position by moving the main tower 72 in Y-direction and by moving the bearing 521 on said tower in Z-direction. Correspondingly, the rotary bearing 521 for the portal carrier 71 on the support tower 73 is moved to the same height position in order to be moved to the Y-position corresponding to the tower 72 for the purpose of closing the bridge 7.

The bearing 521 on the main tower 72 comprises a weight mass 79 that generates a lever weight that counteracts the lever weight of the portal carrier 71 in order to hold the portal carrier 71 in its raised position pivoted by a small pivot angle, as shown in FIG. 10.

Expediently, as is shown in the exemplary embodiment of FIG. 13, the installation device 12 that comprises the portal devices 7, 8 can comprise portal carriers 71, 81 that may be held at an inclination to the X-Y-plane and that are aligned substantially parallel to the X-Y-plane for the purpose of carrying out longitudinal seam processing also on a contour 990 extending at an inclination to the X-direction, for example on a cone section 99. To this effect the drag bearing 75 of the inner portal device 7 may be used, wherein an accordingly large pivot region is provided. Correspondingly, the tower 82 of the outer portal carrier 81 is held by means of a fixed bearing which makes it possible to set a carrier position that is tilted in the Z-direction. On the other tower 83, as is the case on the tower 73 for bearing 531, a support bearing or a movable bearing is provided in order to be able to set up the inclined position so that it is adjustable.

All the processes are automatically controlled, by means of normal machine controls, according to the prefabricated fuselage to be processed.

Alternative combinations and variations of the examples provided will become apparent based on this patent disclosure. It is not possible to provide specific examples for all of the many combinations and variations of the embodiments described, but such combinations and variations will be apparent to a person skilled in the field of the invention who becomes familiar with this patent disclosure.

The invention claimed is:

1. An installation device for connecting shell-shaped longitudinal segments of a jacket body, the jacket body forming a large component that extends longitudinally, defining a hollow space with an open face and having at least one connection seam on the body jacket for closing a circumferential side, the installation device comprising:
   at least one tool pair having an inner tool, movably guided within the hollow space in the longitudinal direction of the jacket body, and an outer tool, movably guided outside the hollow space in longitudinal direction of the jacket body, wherein for the purpose of producing the at least one connection seam the at least one tool pair acting together as a pair in the direction across the longitudinal direction of the body;
a carrier pair including an inner guide carrier, extending in the longitudinal direction of the body and movably guiding the inner tool within the hollow space of the jacket body, and an outer guide carrier, extending outside the jacket body in the longitudinal direction of the body and movably guiding the outer tool, wherein the inner guide carrier and the outer guide carrier are each rotatably held according to at least one longitudinal rotary axis oriented by an outer longitudinal contour of the jacket body, and are slidably held and fastenable in at least two separate spatial directions that extend across the longitudinal direction of the body, such that the tools are capable of being positioned along the circumference of the jacket body as a pair for producing the at least one connection seam; and
a carrier frame extending in longitudinal direction, the carrier frame supporting the carrier pair and being rotatably mounted on a bearing axis coinciding with a longitudinal symmetry axis of the carrier frame, the bearing axis forming a mutual longitudinal rotary axis for the two guide carriers, wherein the carrier frame comprises a frame web connecting the two guide carriers of a carrier pair, wherein the frame web is rotatably mounted to an end of the carrier frame, the frame web is detachably connected to the frame guide carriers and is moveable to a position that provides access to a front space in front of the inner guide carrier.

2. The installation device of claim 1, wherein the carrier frame is provided with a mass acting as a counterbalance weight, such that the carrier frame is held in a position wherein the frame web is completely separated from the frame guide carriers.

3. The installation device of claim 1, wherein the carrier frame is mounted such that the carrier frame is capable of being relocated to at least two positions, positioning each of the frame guide carriers in alignment with an outer longitudinal contour of the jacket body.

4. The installation device of claim 3, further comprising a bearing device, the carrier frame being mounted on the bearing device, the bearing device on the frame webs in their direction of extension comprises curved bearing sections, as well as corresponding bearing sections that accommodate said curved bearing sections.

5. The installation device of claim 1, wherein the installation device comprises column-like mounting parts between which the carrier frame is arranged and on which it is held so as to be rotatable on a longitudinal axis, wherein the column-like mounting parts in at least a first spatial direction across the longitudinal direction of the jacket body are arranged so as to be mutually movable and fastenable.

6. The installation device of claim 1, wherein the column-like mounting parts carry rotary bearings that hold the frame carrier and that are adjustable in the spatial direction across the longitudinal direction of the jacket body as far as the column height of the mounting parts is concerned.

7. The installation device of claim 1, wherein the at least one tool pair includes the inner tool and the outer tool for establishing a riveted connection.

8. The installation device of claim 7, wherein the at least one tool pair comprises a riveting tool that place rivets into the jacket body free of any introduction of force on the jacket body.

9. The installation device of claim 1, wherein the installation device for the placement of the at least one longitudinal connection seam is designed to produce a jacket body which at least along one longitudinal section is substantially cylindrical in shape.

10. The installation device of claim 1, wherein the installation device for the placement of at least one longitudinal connection seam is capable of producing a jacket body having a conical longitudinal section.

11. The installation device of claim 1, wherein each tool guide carrier is rotatably displaceable on associated longitudinal rotary axes and is translatively displaceable in two separate transverse directions that are substantially perpendicular in relation to each other.

12. An installation device for connecting shell-shaped longitudinal segments of a jacket body, the jacket body forming a large component that extends longitudinally, defining a hollow space with an open face and having at least one connection seam on the body jacket for closing a circumferential side, the installation device comprising: at least one tool pair having an inner tool, movably guided within the hollow space in the longitudinal direction of the jacket body, and an outer tool, movably guided outside the hollow space in longitudinal direction of the jacket body, wherein for the purpose of producing the at least one connection seam the at least one tool pair acting together as a pair in the direction across the longitudinal direction of the body; a carrier pair including an inner guide carrier, extending in the longitudinal direction of the body and movably guiding the inner tool within the hollow space of the jacket body, and an outer guide carrier, extending outside the jacket body in the longitudinal direction of the body and movably guiding the outer tool, wherein the inner guide carrier and the outer guide carrier are each rotatably held according to at least one longitudinal rotary axis oriented by an outer longitudinal contour of the jacket body, and are slidably held and fastenable in at least two separate spatial directions that extend across the longitudinal direction of the body, such that the tools are capable of being positioned along the circumference of the jacket body as a pair for producing the at least one connection seam, wherein the installation device comprises an inner portal device that holds at least one inner guide carrier, and at least one outer portal device that holds at least one outer guide carrier, the inner guide carrier rotatably adjustable on a longitudinal rotary axis of the inner portal device, while the outer guide carrier is rotatably adjustable on a longitudinal rotary axis of the outer portal device.

13. The installation device of claim 12, wherein the at least one tool pair includes the inner tool and the outer tool for establishing a riveted connection.

14. The installation device of claim 13, wherein the at least one tool pair comprises a riveting tool that place rivets into the jacket body free of any introduction of force on the jacket body.

15. The installation device of claim 12, wherein the installation device for the placement of the at least one longitudinal connection seam is designed to produce a jacket body which at least along one longitudinal section is substantially cylindrical in shape.

16. The installation device of claim 12, wherein the installation device for the placement of at least one longitudinal connection seam is capable of producing a jacket body having a conical longitudinal section.

17. The installation device of claim 12, wherein each tool guide carrier is rotatably displaceable on associated longitudinal rotary axes and is translatively displaceable in two separate transverse directions that are substantially perpendicular in relation to each other.

18. The installation device of claim 12, wherein at least one portal device comprises a portal carrier, which is formed by at least one inner longitudinal section that forms a guide carrier, as well as by bearing sections at its ends.

19. The installation device of claim 12, wherein in each case the inner portal device and the outer portal device comprise two column-like mounting parts, between which in each case, the associated portal carrier is arranged and on which mounting parts it is held, wherein the column-like mounting parts of each portal device are arranged so as to be mutually movable in at least a first spatial direction across the longitudinal direction of the jacket body and are arranged so as to be fastenable, and carry rotary bearings which hold the portal carrier and are adjustable in at least one second spatial direction across the longitudinal direction of the jacket body.

20. The installation device of claim 19, wherein on the column-like mounting parts, the inner portal carrier device and of the outer portal carrier device height-adjustable and arrestable support bearings for the portal carriers are arranged in such a way that the portal carriers in substantially parallel position in relation to each other may selectively be moved to at least two positions in which they are aligned according to the varying outside longitudinal contour of the jacket body.

21. The installation device of claim 12, wherein the inner portal device comprises column-like mounting parts on which the inner portal carrier is detachably held in such a way that in the detached state, at least one mounting part may be moved to a position that provides access to a front space in front of the inner portal carrier.

22. The installation device of claim 21, wherein the inner portal device is pivotably held to a first column-like mounting part, on which the inner portal carrier is pivotably held in the direction of the column height, as well as being held to a second column-like mounting part on which for pivoted lifting the inner portal carrier is liftably held in order to release the second column-like mounting part for the process.

23. The installation device of claim 22, wherein at its pivotably held end, the outer portal carrier is a weight mass which generates a lever weight that lifts the other end of the inner portal carrier.

\* \* \* \* \*